United States Patent [19]

Hoyt et al.

[11] Patent Number: 4,841,389
[45] Date of Patent: Jun. 20, 1989

[54] MAGNETIC TRANSDUCER CRASH ANTICIPATION AND RESPONSE METHOD AND APPARATUS

[75] Inventors: Roger F. Hoyt; Carl M. Jefferson, both of San Jose; Steven E. Millman, Campbell, all of Calif.

[73] Assignee: International Business Machines Corporation, Armonk, N.Y.

[21] Appl. No.: 60,578

[22] Filed: Jun. 11, 1987

[51] Int. Cl.$^4$ .......................... G11B 5/60; G11B 21/02
[52] U.S. Cl. ...................................... 360/75; 360/103; 324/226
[58] Field of Search .................... 360/75, 109, 97, 103, 360/106, 97.01; 324/207, 208, 210, 226

[56] References Cited

U.S. PATENT DOCUMENTS 4,146,911  3/1979  Gyi et al. ............................... 360/75
4,777,544  10/1988  Brown et al. .......................... 360/75

FOREIGN PATENT DOCUMENTS 0105094  4/1984  European Pat. Off. .
0209140  1/1987  European Pat. Off. .

OTHER PUBLICATIONS

A. A. Gaudet et al., "Head Flight Height Monitoring", IBM Technical Disclosure Bulletin, vol. 11, No. 12, May 1969, p. 1650.

R. L. Wallace, Jr., "The Reproduction of Magnetically Recorded Signals", The Bell System Technical Journal, vol. 30, Oct. 1951, pp. 1145–1173.

W. K. Shi et al., "Use of Readback Signal Modulation to Measure Head/Disk Spacing Variations in Magnetic Disk Files", Technical Report No. 11, The Center for Magnetic Recording Research, University of California, San Diego, Dec. 1985.

F. Morris et al., "Effect of Flying Height Variation on Offtrack Data Handling", IEEE Trans. on Magnetics MAG-17, No. 4, Jul. 1981, pp. 1372–1375.

Primary Examiner—Vincent P. Canney
Assistant Examiner—Steven R. Garland
Attorney, Agent, or Firm—Henry E. Otto, Jr.

[57] ABSTRACT

A self-diagnostic method and apparatus is described for indicating the likelihood of an impending crash of a magnetic transducer or head with a rotating magnetic medium by dynamically and periodically calculating overwrite efficiency for performing a desired control operation when it exceeds a preselected value denoting dangerous proximity of the transducer to the surface of the medium.

18 Claims, 2 Drawing Sheets

MAGNETIC TRANSDUCER CRASH ANTICIPATION AND RESPONSE METHOD AND APPARATUS

DESCRIPTION

1. Technical Field

This invention relates to moving storage apparatus of the type in which a magnetic transducer or head "flies" above the medium surface when the medium is moving at operating speed. More particularly, this invention relates to a method and apparatus for measuring relative changes in the flying height of the transducer over the storage medium to measure deterioration over time as a precursor to an impending crash of the transducer with the medium while the latter is moving at or close to operating speed.

2. Background

Magnetic disks have been used for years for high capacity random access storage. One or more magnetic transducers, called magnetic heads, are disposed adjacent a magnetic recording surface on the disk to write data on and read data from the recording surface. A slider supports one or more magnetic heads. The slider is lightly biased to cause the heads to move toward the recording surface when the disk is stationary; but as the disk is brought up to operating speed, an air bearing is generated which moves each slider and hence the head(s) away from the recording surface toward a preselected flying height. As disk storage capacity is increased by decreasing track width and transducing gaps, the head(s) must fly closer and closer to the recording surface in order to insure adequate signal strength. This increases the hazard of so-called "head crashes" which wipe out previously recorded data and also may damage the recording surface. These crashes occur when the head and slider scrape the recording surface of the moving disk.

The effect of head/media spacing on the amplitude of magnetic readback signals is described by R. L. Wallace, Jr. in "The Reproduction of Magnetically Recorded Signals", The Bell System Technical Journal, Vol. 30, Oct. 1951, pp. 1145–1173. This publication includes the Wallace equation which expresses the dependence of the readback voltage on various recording parameters including the head/disk spacing.

Modulation of the read signal envelope to measure variations in head/disk spacing is described in Shi et al, "Use of Readback Signal Modulation to Measure Head/Disk Spacing variations in Magnetic Disk Files", Technical Report No. 11, The Center for Magnetic Recording Research, University of California, San Diego, December 1985. The readback signal modulation technique is used in conjunction with a laser-doppler vibrometer to measure simultaneously the spacing variation and disk vibrations that result from various laboratory induced impacts directly on the disk of an operating disk file. While this apparatus is useful as a laboratory tool in the research and development of magnetic disk files, the disk file structure must be altered to accommodate the laser-doppler vibrometer and the equipment required is very costly.

"Effect of Flying Height Variation on Offtrack Data Handling" by Morris et al, IEEE Trans. on Magnetics MAG-17 No. 4, July 1981, pp. 1372–1375 infers flying height variations by modulation of the magnetic head read signal and correlates the flying height variation to offtrack data handling capability.

"Head Flight Height Monitoring" by Baudet et al, IBM Technical Disclosure Bulletin, Vol. 11, No. 12, May 1969, p. 1650, describes an arrangement using the modulation of the read signal envelope to measure variations in head/disk spacing. The control factor described there is based on a comparison of the amplitude of an instantaneously detected read signal level with a continuously modified or running average amplitude of previously detected levels. Hence, this may not signal an impending head crash if, as we have found, the deterioration in flying height preceding a head crash is usually gradual.

Also of interest is the copending application of B. R. Brown et al, Ser. No. 06/897,180 filed Aug. 15, 1986, now U.S. Pat. No. 4,777,544 and assigned to the assignee of the present invention. It discloses a method and apparatus for measuring the head/recording surface clearance in situ. It requires a readback signal to be sensed periodically, first at normal operating speed at a first flying height, and thereafter at substantially zero flying height following reduction in disk speed. These signals are then used in an algorithm to calculate whether the first flying height has deteriorated to a degree indicative of an impending head crash. While this arrangement operates satisfactorily, writing and reading of data is undesirably interrupted during this periodic disk speed reduction.

It would therefore be desirable to provide a self-diagnostic method and apparatus that would (a) reliably, dynamically and periodically indicate the likelihood of an impending head crash without requiring the speed of the disk to be reduced, (b) desirably be based upon contemporaneous readback signal inputs so as to eliminate any errors due to differences in ambient conditions that may otherwise exist if the respective signals are sensed at widely spaced time intervals, and (c) be based upon signal overwrite efficiency, rather than upon the readback signal amplitude at the particular instant the amplitude is being measured.

SUMMARY OF THE INVENTION

Toward this end and according to the invention, there is disclosed a method and apparatus for denoting the likelihood of an impending crash of a magnetic transducer against a rotating magnetic recording medium due to deterioration in flying height of the transducer below a predetermined acceptable value. The term "flying height" as used herein to describe our invention, is defined as the height of the transducer above the exposed surface of the recording medium.

When the term frequency $f_l$ or $f_h$ is hereinafter used, it is to be understood that it respectively connotes $2f_l$ or $2f_h$ magnetic field reversals per second on the recording medium.

According to a preferred embodiment, the method and apparatus involve writing one signal at a predetermined amplitude and at a frequency $f_l$ on a predetermined dedicated track on the recording medium, then reading back said one signal at that same frequency $f_l$ and storing its spectral amplitude. The dedicated track is then overwritten with another signal at said predetermined amplitude but at a higher frequency $f_h$, then the component of said one signal remaining after said overwriting is read back and its spectral amplitude stored. The ratio of the spectral amplitudes of said one signal as read before overwriting and said remaining component as read after overwriting are calculated and used to initiate a desired control operation when the ratio denotes that flying height is below the acceptable value.

According to another embodiment, the method and apparatus involve writing one signal at a frequency $f_l$ on a dedicated track of the recording medium and then overwriting with another signal at a higher frequency $f_h$. Readback signals from this dedicated track are sensed following the writing at $f_l$ and following the overwriting at $f_h$. The ratio of the amplitudes of the readback signal following overwriting at $f_h$ to that following writing at $f_l$ is calculated and used to initiate a desired control operation when the ratio denotes that the flying height is below the acceptable value.

Thus, both embodiments are based upon contemporaneous readback measurements indicative of signal overwrite efficiency.

These methods may be employed with any rotating recording medium comprising either epoxy based or thin film disks.

DESCRIPTION OF PREFERRED EMBODIMENT

Figure 1:
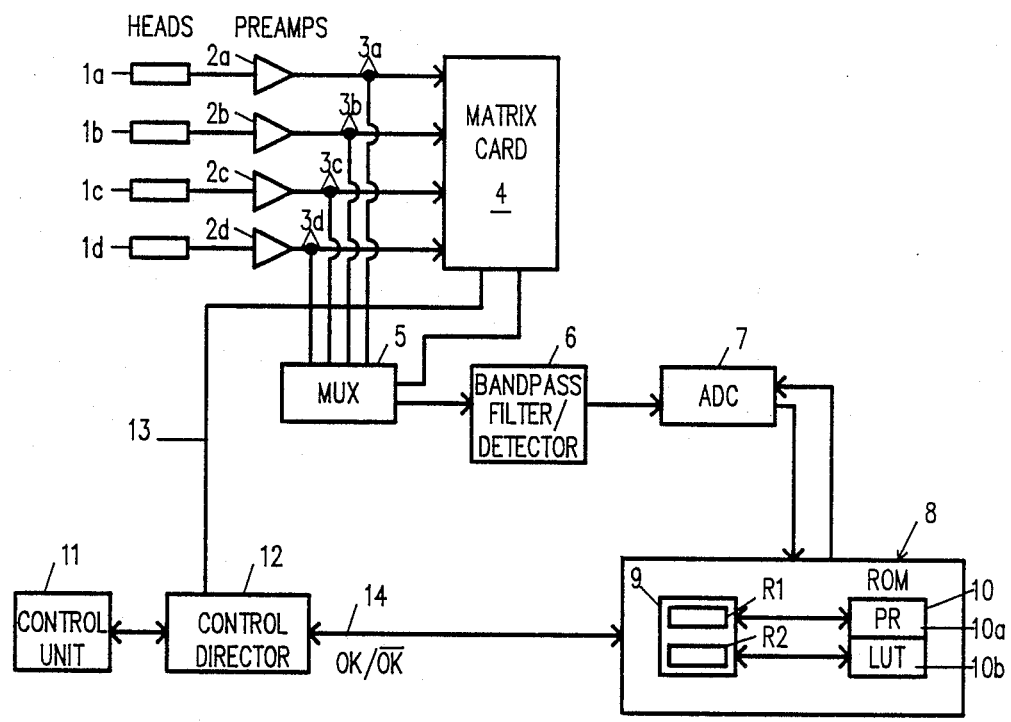
FIG. 1 is a schematic view of an apparatus embodying the invention.
Figure 2:
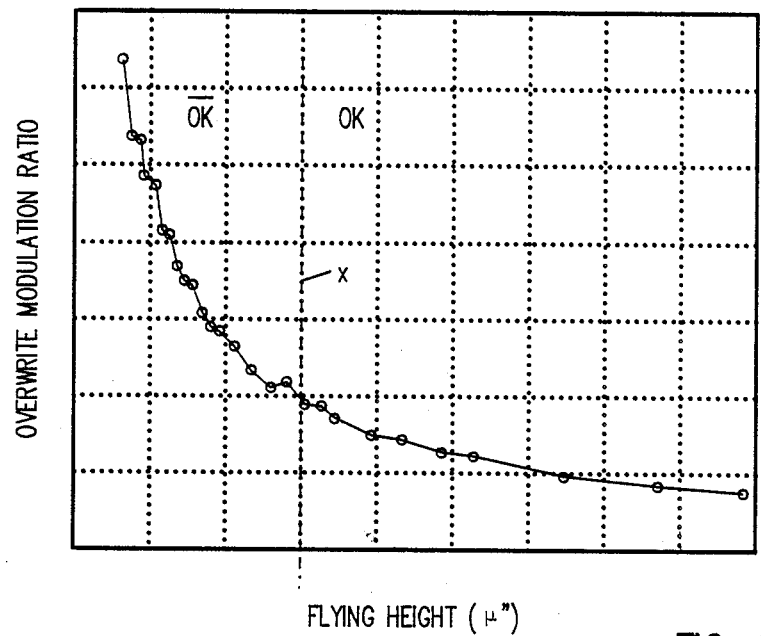
FIG. 2 is a plot of overwrite modulation ratio versus transducer flying height.

FIGS. 1 and 2

As schematically illustrated in FIG. 1, the apparatus according to this embodiment comprises a plurality of magnetic transducers or heads 1a–d connected via respective preamplifiers 2a–d and lines 3a–d to a matrix card 4. Card 4 contains means, including an automatic gain control amplifier and detection electronics, for writing data on and reading data from a conventional rotating recording medium (not shown).

The apparatus as thus far described is conventional and commonly used in multiple-head disk files, such as the IBM 3380 direct access storage device.

According to the invention, branches of lines 3a–d are connected via a multiplexer 5, a bandpass filter/detector 6, and an analog-to-digital converter (ADC) 7 to a digital control unit 8. Digital control unit 8 comprises a microprocessor 9 and a read only memory (ROM) 10.

Microprocessor 9 may be a dedicated microprocessor, such as the well-known Model 80286 made and marketed by Intel Corporation. This microprocessor contains a plurality of registers, including R1 and R2.

ROM 10 may comprise two portions, 10a, 10b. Portion 10a contains the program instructions concerning the digital values of the spectral amplitudes of the signals at frequencies $f_l$ and $f_h$ and instructions as to what to do when the predesignated test track of the recording medium is accessed. Portion 10b constitutes a lookup table that contains a series of values corresponding to overwrite modulation ratios as measured when the transducer is flown at various known flying heights while the recording medium is rotated at a constant normal operational velocity.

In operation, assume that the magnetic recording medium is rotating at constant velocity and that the flying height condition for a particular transducer, say 1b, is to be measured. For sake of illustration, a control unit 11, such as the IBM 3880, will be operative, according to a preselected instruction, to periodically interrupt its normal operation and will signal a control director 12 to position that transducer 1b at the predesignated dedicated test track on the medium. Control director 12 will then via a line 13 instruct the circuitry in the matrix card 4 to write the following sequence of signals on the test track and then read them back: One signal at a predetermined amplitude will be written at a frequency $f_l$ via matrix card 4, then read back. Circuitry on matrix card 4 will condition multiplexer 5 to cause this readback signal as tapped off via the branch of line 3b to be transmitted via multiplexer 5 and filter/detector 6 and converted by ADC 7 and its spectral amplitude stored in register R1 of microprocessor 9. Then the test track will be immediately overwritten with another signal at a higher frequency $f_h$; whereupon the component of said one signal written at frequency $f_l$ remaining after such overwriting will be read back and, via 3b,5,6,7, its spectral amplitude will be stored in register R2. Microprocessor 9 will then calculate the ratio of the spectra amplitudes of said one signal before and after the overwriting as stored in R1,R2 and compare said ratio against the ratios in lookup table 10b. The microprocessor 9 will then signal control director 12 via OK/$\overline{OK}$ line 14 whether the ratio is above or below a preselected value (see x on FIG. 2). If above said value x, a crash is considered imminent. This will bring up a $\overline{OK}$ signal in line 14, in response to which the control director 12 will signal the control unit 11 to perform a desired control operation; e.g., initiating transfer of data from the medium accessed by said selected transducer 1b or shutting down operation of all recording media accessed by the transducer array.

DESCRIPTION OF ALTERNATIVE EMBODIMENT

Figure 3:
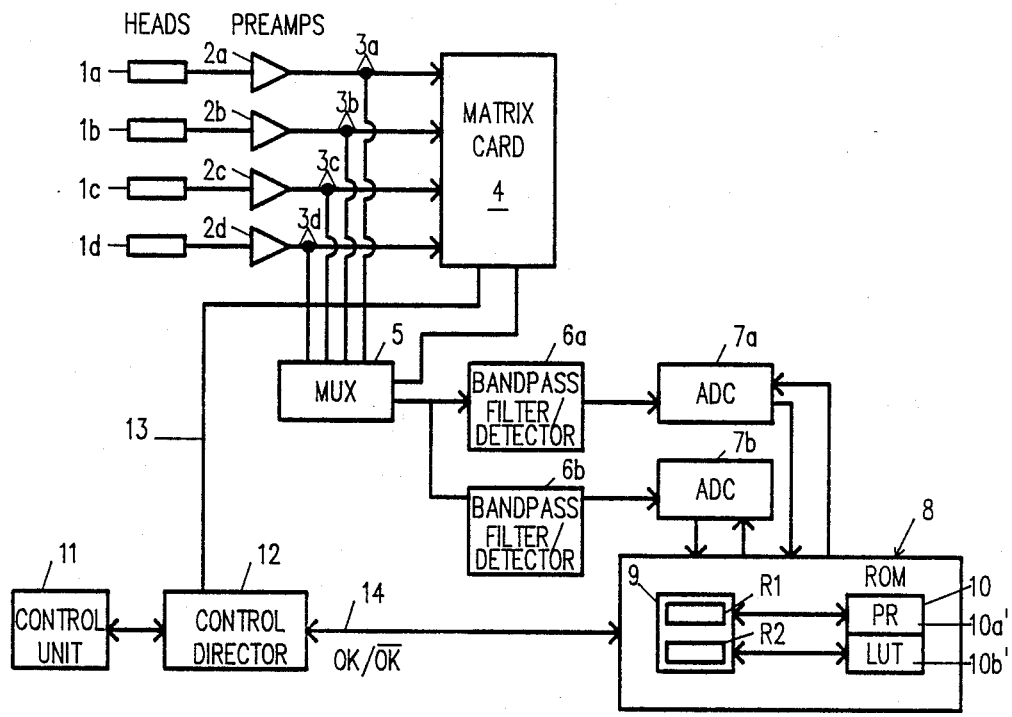
FIG. 3 is a schematic view of an apparatus according to another embodiment of the invention.
Figure 4:
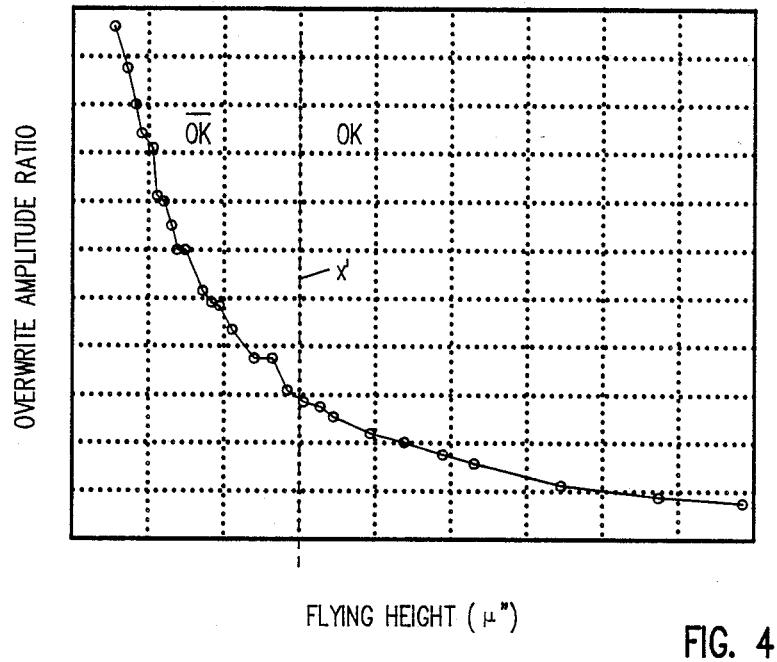
FIG. 4 is a plot of overwrite amplitude ratio versus transducer flying height.

FIGS. 3 and 4

This embodiment, like that in FIGS. 1 and 2, employs measurement of overwrite efficiency to indicate likelihood of transducer crash. It differs structurally in slight respects from that of FIGS. 1 and 2 in that it comprises bandpass filters/detectors 6a,b and ADCs 7a,7b in lieu of the single filter/detector 6 and ADC 7 of FIGS. 1 and 2.

Register R1, as heretofore, stores the spectral amplitude of the frequency $f_l$ signal as read back after overwriting at frequency $f_h$; but register R2 stores the spectral amplitude of the signal overwritten at frequency $f_h$.

In operation, one signal at frequency $f_l$ is written on the predesignated dedicated test track by the transducer, e.g., 1b, selected for flying height change test. Then said one signal is overwritten with another signal at a higher frequency $f_h$. After this overwriting, the residual signal at frequency $f_l$ is then read back via multiplexer 5, filter/detector 6a and ADC 7a, and its amplitude stored in register R1. The signal at frequency $f_h$ is then read back via 5,6b,7b and its amplitude is stored in register R2. Microprocessor 9 now calculates the ratio of the amplitude as stored in R2 to that as stored in R1, then compares the ratio against overwrite amplitude values in the lookup table 10b'. As before, if the ratio exceeds a certain value x' (see FIG. 4), indicating flying height is below an acceptable value, then a $\overline{OK}$ signal in line 14 will signal the control director 12 to initiate the desired control operation.

It should be noted that the test operation according to either of the above-described embodiments can be accomplished in not more than four revolutions of the recording medium. Although the disclosed method requires dedication of one track per recording surface as a test track, the effect on throughput capability is minimal (probably less than one-tenth of one percent). This throughput reduction is deemed insignificant and acceptable in view of the increased likelihood that an impending transducer crash can be avoided by the self-diagnostic techniques herein disclosed.

It should further be noted that, as disclosed, there is (as there must be) access to the readback signals from the preamplifiers 2a–d before they have undergone any gain compression or automatic gain control. The required signals are already available on the matrix card 4 as used in the IBM 3380 disk file. If desired, the electronics (depicted as 5,6,7,8 herein) needed to implement either embodiment may be incorporated on the matrix card 4. The control director 12 is preferably that presently used in the IBM 3380 but modified so as to allow the diagnostic tests to be performed periodically. The ratio of $f_h$ to $f_l$ preferably closely matches the ratio of frequencies used in the particular storage device, and would thus be substantially 2.666 for the IBM 3380 disk file. This ratio, in any event should be a nonintegral value to avoid harmonic effects.

Moreover, as will be apparent, the test operations may be performed at any time; e.g., before release of the product from manufacturing, to detect and replace any slider which is flying its associated transducer below a predetermined nominal acceptable flying height, as well as periodically during customer use.

While the invention has been shown and described with reference to preferred embodiments thereof, it will be understood by those skilled in the art that the foregoing and other changes in form and detail may be made therein without departing from the spirit, scope and teaching of the invention. Accordingly, the method and apparatus herein disclosed are to be considered merely as illustrative and the invention is to be limited only as specified in the claims.

We claim:

1. A method for denoting the likelihood of an impending crash of a magnetic transducer against a rotating magnetic recording medium due to deterioration in flying height of the transducer below a predetermined acceptable value comprising the steps, while the medium is being rotated at substantially constant velocity, of:
    over a predetermined area of said recording medium, writing one signal at a predetermined amplitude and at a frequency $f_l$;
    reading back said one signal at frequency $f_l$ and storing its spectral amplitude;
    overwriting said predetermined area with another signal at said predetermined amplitude but at a higher frequency $f_h$;
    then reading back the component of said one signal remaining after said overwriting and storing its spectral amplitude;
    calculating the ratio of the spectral amplitudes of said one signal as read before said overwriting and said remaining component of said one signal as read after said overwriting; and
    using said ratio to initiate a desired control operation when said ratio denotes that flying height is below said acceptable value.

2. The method according to claim 1, wherein said predetermined area constitutes at least a portion of at least one allocated track on the rotating magnetic medium.

3. The method according to claim 1, wherein said writing, sensing calculating and using steps are performed periodically according to a selectable timing sequence.

4. The method according to claim 1, including the further steps of providing a plurality of magnetic transducers for reading indicia from a single recording medium, and
    multiplexing said writing, reading, calculating and using steps periodically among different ones of said transducers for initiating said control operation when the flying height of any one of said transducers is below said value.

5. The method according to claim 1, wherein the ratio of $f_h$ to $f_l$ closely matches the ratio of frequencies used in said rotatable magnetic recording medium.

6. The method according to claim 1, wherein the ratio of $f_h$ to $f_l$ is a nonintegral value.

7. The method according to claim 1, wherein during said using step, the ratio of the spectral amplitudes as calculated is compared to that in a lookup table to denote flying height acceptability.

8. Apparatus for performing a desired control operation responsively to an indication of an impending crash of a magnetic transducer against a rotating magnetic recording medium due to deterioration in flying height of the transducer below a predetermined acceptable value, said apparatus comprising:
    means for writing, over a predetermined area of said recording medium, one signal at a predetermined amplitude and at a frequency $f_l$;
    means for reading back said one signal at a frequency $f_l$ and storing its spectral amplitude;
    means for overwriting said predetermined area with another signal at said predetermined amplitude but at a higher frequency $f_h$;
    means for reading back the component of said one signal remaining after said overwriting and storing its spectral amplitude;
    means for calculating the ratio of said spectral amplitudes as read back before and after said overwriting; and
    means for initiating the desired control operation when said ratio denotes that flying height is below said acceptable value.

9. Apparatus according to claim 8, having a plurality of magnetic transducers for reading indicia from a single recording medium, and
    multiplexing means for causing said means for writing, reading, calculating and initiating to be operated periodically among different ones of said transducers for initiating said control operation when the flying height of any one of said transducers is below said value.

10. Apparatus for performing a desired control operation responsively to an indication of an impending crash of a magnetic transducer against a rotating magnetic recording medium due to deterioration in flying height of the transducer below a predetermined acceptable value, said apparatus comprising:
    means for writing, over a predetermined area of said recording medium, one signal at a predetermined amplitude and at a frequency $f_l$;

means for reading back said one signal at a frequency $f_l$ and storing its spectral amplitude;

means for overwriting said predetermined area with another signal at said predetermined amplitude but at a higher frequency $f_h$;

means for reading back the component of said one signal remaining after said overwriting and storing its spectral amplitude;

means for calculating the ratio of said spectral amplitudes as read back before and after said overwriting;

a lookup table containing values of said ratio as measured at different flying heights while the medium is rotated at constant normal velocity;

means for comparing the ratio as calculated to a ratio in said table; and means for initiating the desired control operation when said ratio as calculated exceeds a preselected value which denotes that flying height is below said acceptable value.

11. A method for denoting the likelihood of an impending crash of a magnetic transducer against a rotating magnetic recording medium due to deterioration in flying height of the transducer below a predetermined acceptable value comprising the steps, while the medium is being rotated at substantially constant velocity, of:

over a predetermined area of said recording medium, writing one signal at a predetermined amplitude and at a frequency $f_l$ and then overwriting with another signal at said predetermined amplitude but at a higher frequency $f_h$;

following the overwriting at frequency $f_h$, sensing said one and other signals as read back from said predetermined area to produce first and second readback signals, respectively;

calculating the ratio of the amplitudes of said second readback signal to said first readback signal;

comparing the ratio as calculated to that in a lookup table; and initiating a desired control operation when said ratio as calculated denotes that the flying height is below said acceptable value.

12. The method according to claim 11, wherein said predetermined area constitutes at least a portion of at least one allocated track on the rotating magnetic medium.

13. The method according to claim 11, wherein said writing, sensing calculating and comparing steps are performed periodically according to a selectable timing sequence.

14. The method according to claim 11, including the further steps of providing a plurality of magnetic transducers for reading indicia from a single recording medium, and multiplexing said writing, sensing, calculating and comparing steps periodically in a selectable sequence among different ones of said transducers for initiating said control operation when the flying height of any one of said transducers is below said value.

15. The method according to claim 11, wherein the ratio of $f_h$ to $f_l$ closely matches the ratio of frequencies used in said rotatable magnetic recording medium.

16. The method according to claim 11, wherein the ratio of $f_h$ to $f_l$ is a nonintegral value.

17. Apparatus for performing a desired control operation responsively to an indication of an impending crash of a magnetic transducer against a rotating magnetic recording medium due to deterioration in flying height of the transducer below a predetermined acceptable value, said apparatus comprising:

means operative while the recording medium is rotating at substantially constant velocity for writing, over a predetermined area of said recording medium, one signal at a predetermined amplitude and a frequency $f_l$ and then overwriting that signal with another signal at said amplitude but at a higher frequency $f_h$;

means for reading back said one and other signals from said predetermined area after overwriting at frequency $f_h$ to produce first and second readback signals, respectively;

means for calculating the ratio of the amplitudes of said second readback signal to said first readback signal;

a lookup table containing values of said ratio as measured at different flying heights while the medium is rotated at constant normal velocity;

means for comparing the ratio as calculated to a ratio in said table; and means for initiating the desired control operation when said ratio as calculated exceeds a predetermined value which denotes that the flying height is below said acceptable value.

18. Apparatus according to claim 17, having a plurality of magnetic transducer for reading indicia from a single recording medium, and multiplexing means for causing said means for writing, reading back, calculating and initiating to be operated periodically among different ones of said transducers for initiating said control operation when the flying height of any one of said transducers is below said value.

* * * * *